United States Patent [19]
Larue et al.

[11] 3,961,581
[45] June 8, 1976

[54] IGNITOR ELEMENT FOR A GENERATOR OF HOT GAS

[75] Inventors: Pierre Larue, Orsay; Pierre Beaumont, Massy, both of France

[73] Assignee: Office National d'Etudes et de Recherches Aerospatiales (O.N.E.R.A.), Chabillon-Sous-Bagmeux, France

[22] Filed: Apr. 30, 1975

[21] Appl. No.: 572,893

Related U.S. Application Data

[63] Continuation of Ser. No. 366,166, June 1, 1973, abandoned, which is a continuation of Ser. No. 108,418, Jan. 21, 1971, abandoned.

[30] Foreign Application Priority Data
Jan. 27, 1970   France .............................. 70.02873

[52] U.S. Cl. ............................ 102/99; 60/39.82 E; 60/255; 60/256; 102/39
[51] Int. Cl.$^2$ ........................................... F42B 1/00

[58] Field of Search .................. 102/38, 39, 99–104, 102/70 R, 71, 72; 60/254, 255, 256, 39.82 E

[56] References Cited
UNITED STATES PATENTS

| | | | |
|---|---|---|---|
| 677,527 | 7/1901 | Maxim | 102/99 |
| 694,295 | 2/1902 | Maxim | 102/99 |
| 989,375 | 4/1911 | Luciani | 102/99 |
| 3,304,867 | 2/1967 | Nadel | 102/99 |
| 3,392,673 | 7/1968 | King | 60/39.82 E |

*Primary Examiner*—Samuel W. Engle
*Assistant Examiner*—Harold Tudor
*Attorney, Agent, or Firm*—Larson, Taylor & Hinds

[57] ABSTRACT

The igniter of the generator is constituted by a deformable plate of solid propergol bound and fixed on a wooden or metal sleeve mandrel. The plate has open striae parallel to the axis of the support and oriented radially inwards or outwards. The device is useful as an initiator for a solid propergol rocket motor.

3 Claims, 4 Drawing Figures

IGNITOR ELEMENT FOR A GENERATOR OF HOT GAS

This is a continuation, of application Ser. No. 366,166 now abandoned filed 6/1/73, now abandoned which in turn is a Cont. of Ser. No. 108,418 filed 1/21/71.

The invention relates, generally, to solid generators of hot gases, that is to say to apparatus capable of emitting a flow of hot gases (containing possibly condensed phases) resulting from a combustion reaction (as opposed to conflagration or explosion reactions) of a solid material hereinbefore referred to as "propergol". The latter expression is used to denote a one-piece energising product sometimes simply called "powder" and often described in international technical language as "solid propellant".

The invention relates more particularly, because it is in this case that its applications seem to offer the most advantage, but not exclusively, among such apparatuses, to solid propergol igniters intended for the firing of the propellent charge of a solid propergol rocket motor, such igniters generally being required to operate at a considerable flow rate for a very brief time which can be less than 100 milliseconds.

It is known that certain solid propergol generators of hot gases in aerospace techniques must have operational characteristics (especially as regards their flow rate and their period of combustion) which are very accurate and reproducable with fidelity in all generators of the same type.

This is the case especially in solid propergol igniters for rocket motors also of solid propergol, such igniters being adapted, on one hand, to the intrinsic characteristics of the solid propergol block whose ignition they must ensure (nature, geometry, dimensions), and on the other hand, to the conditions of use of the rocket-motor which they equip and especially the more or less rapid speed desired, as a function of the mission of the engine, for the increase in pressure in the combustion chamber of the said rocket-motor.

It is a particular object of the invention, to enable the simple and accurate production of a solid propergol generator of hot gases having operational characteristics which are well defined and which are easily reproducable.

In other words, it is an object of the invention to simplify considerably the work of engineering, the adjustment, adaptation and reproduction of a solid propergol generator of hot gases whose purpose is previously indicated, especially when it relates to a solid propergol igniter intended for firing the propellent charge of a rocket-motor also driven by solid propergol, the said igniter then having to be adapted to the intrinsic characteristics and use of the above-said propellent charge.

In accordance with the invention, an igniter element for a generator of hot gas comprises a deformable plate constituted of solid hot gas generating material, one face of the plate having continuous parallel striae constituted by single slits with initially contiguous lips and extending from one end to the other of said plate, the other face of said plate being unstriated, a rigid central mandrel against which said unstriated face is wound and fixed so that the plate forms a single layer without overlapping, the slits being oriented at least approximately parallel to the axis of the central mandrel and the lips of the slits being flared outwardly once said deformable plate is wound around said mandrel, the striae forming continuous outwardly open flame conducting channels open at their ends and providing a considerable passage cross-section for the flow of the combustion products for a given diametric bulk, the mandrel being constituted of a material nonconsummable under the conditions of temperature and duration of operation of the ignitor. The deformable plate wound around the central mandrel forms a cylindrical sleeve, or the deformable plate may be strip-shaped and form a helix around the central mandrel.

Such an igniter with an ignition surface striated in the direction of flow of the products of combustion has numerous and real advantages amongst which may be mentioned especially:

The ignition and combustion surface is considerable for a given diametric bulk, by reason of the presence of the striae;

the cross-section of passage provided for the products of combustion is also considerable, again for a given diametric bulk;

simplicity of construction by cutting out, winding and bonding of a flat element of propergol whose operational characteristics, well defined, depend especially on the depth, the width, and the pitch of the striae, as well as on the nature of the propergol;

ease of adaptation of the charge to desired performances by simply altering the extent of the wound slab of propergol;

possibility of the reproduction easily and with accuracy of propergol charges having the same characteristics, the problem of fidelity in reproduction depending simply on the accuracy of pressing out the deformable slab of propergol;

and the convenience of winding the deformable slab of propergol as well as the absence of dangerous stresses in the said slab once the latter is wound, these latter advantages resulting from the presence of striae parallel to the axis of winding of the abovesaid slab.

Now as regards the constituent material of the striated slabs of propergol, its supply poses no particular problem considering that there exists on the market solid propergols having the required mechanical properties. They are generally composite solid propergols (sometimes also called heterogens) constituted by crystals of combustion-supporting materials (especially perchlorates or nitrates) embedded in a combustible organic binder, such as polyurethane, polybutadiene, polyvinyl chloride, etc., with the possible addition of metallic powders.

When the striae are simple slits with contiguous lips, they can be formed simply, by means of a cutting tool, in the already fabricated slab.

When the striae are grooves of a certain width, they can be formed either by moulding at the time of fabricating the slab, or by machining once the said slab has been fabricated.

From the dimensional point of view and without the indications given below having the least limiting nature, it would seem helpful to indicate that satisfactory results have been obtained with deformable slabs of propergol comprising a solid plate of 2 mm thickness above which extended sheets of propergol separated by parallel striae of which the height varied, from one plate to the next, between 4 and 14 mm, the separations between the striae being variable from 1 to 3 mm.

Now as regards the rigid support to which the striated slab of propergol must be adapted, which support must endure for the whole duration of operation of the generator then being however preferably eliminated once this operation has been achieved, it can advantageously be constituted of wood, or in the form of a thin-walled metallic element (for exaple of aluminum sheet), or of a suitable polymer (acrylic resin, polystyrene, polyethylene).

As for the winding of the propergol slab, it can be effected around a rigid support in the form of a mandrel, for example of wood, in which case the striae can advantageously be simple slits with contiguous lips which then flare outwardly once the winding is effected.

A further embodiment consists of giving the deformable slab of propergol an elongated shape (strip or ribbon configuration) and winding it in a spiral on a mandrel or on a sleeve, either with contiguous turns, or and even better, with noncontiguous turns, this latter solution having the advantage of allowing the existence, throughout the whole length of the winding, of a helicoidal channel facilitating the removal of the combustion products.

In order that the invention may be more fully understood, preferred embodiments of igniters according to the invention, are described below, purely by way of illustrative but non-limiting example, with reference to the accompanying drawings, in which.

Figure 1:
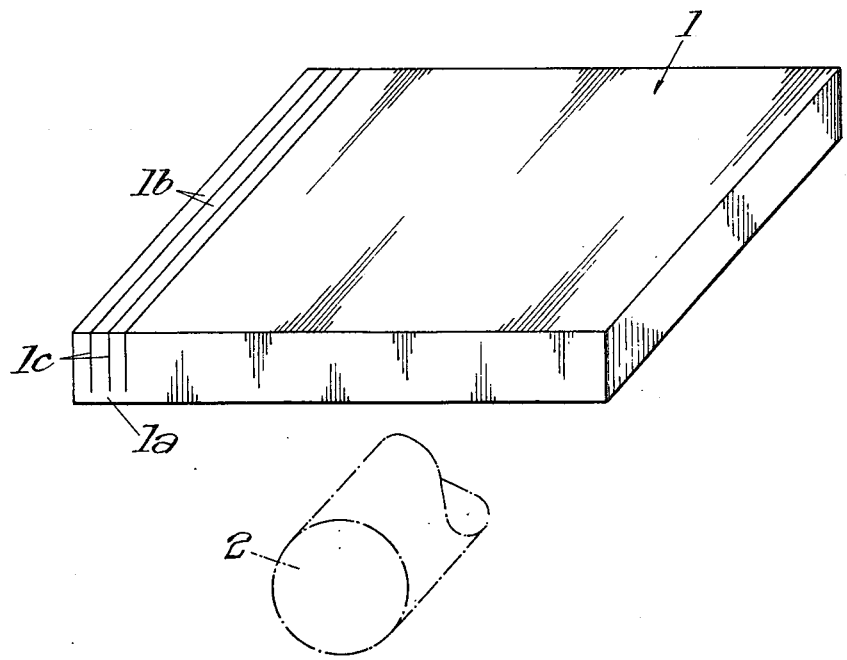
FIG. 1 shows, in diagrammatic perspective, a deformable slab of solid propergol for the manufacture of a charge of propergol intended for an igniter according to a first embodiment of the invention.

FIG. 1 shows a deformable slab of solid propergol 1 intended to the wound and glued to a cylindrical wooden mandrel 2, shown in faint lines below the abovesaid slab 1.

This slab is constituted by a layer of powder 1a surmounted by laminae of powder 1b separated by slits 1c with contiguous lips.

Figure 2:
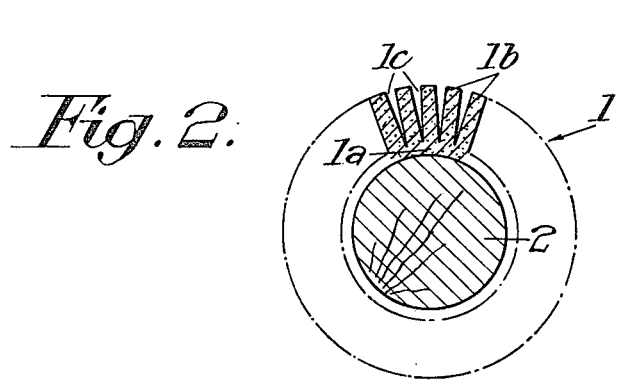
FIG. 2 shows, in diagrammatic cross-section, the abovesaid charge of propergol fabricated.

FIG. 2 shows, in cross-section, the charge of an igniter (for a solid propergol rocket-motor) constituted by winding and fixing by gluing the deformable slab of powder 1 on the mandrel 2, the slits 1c radially oriented, then having an outwardly open V shape, which enables the initial ignition surface to be supplemented by the whole of the sides of laminae 1b.

The operational characteristics of such an igniter (flow rate and duration of combustion) depend on the dimensional characteristics of the slab 1 (here including the slits 1c), and especially, on its surface, as well as on on the nature of the propergol.

Figure 3:
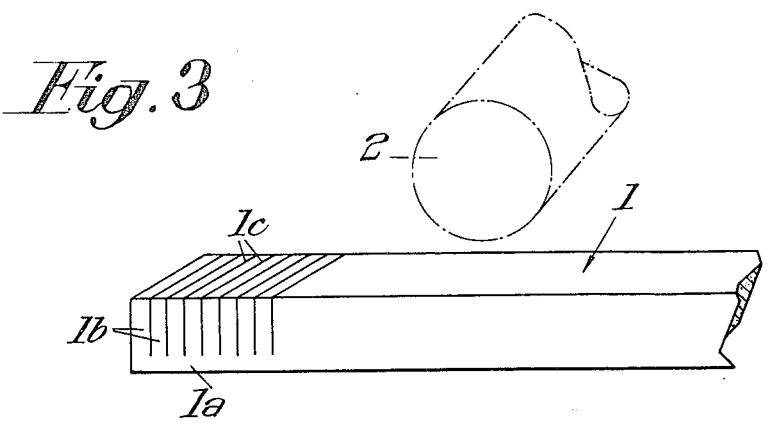
FIGS. 3 and 4, are diagrammatic perspectives of views showing respectively a deformable strip of solid propergol and a charge fabricated by means of the said strip according to a further embodiment of the invention.

FIG. 3 shows a deformable strip of solid propergol 1 intended to be wound and glued on a cylindrical wooden mandrel 2 shown in the faint line above the aforesaid strip. This strip is constituted by a sole plate of powder 1a, surmounted by lamellae 1b, also of powder, separated by slits 1c with contiguous slips.

Figure 4:
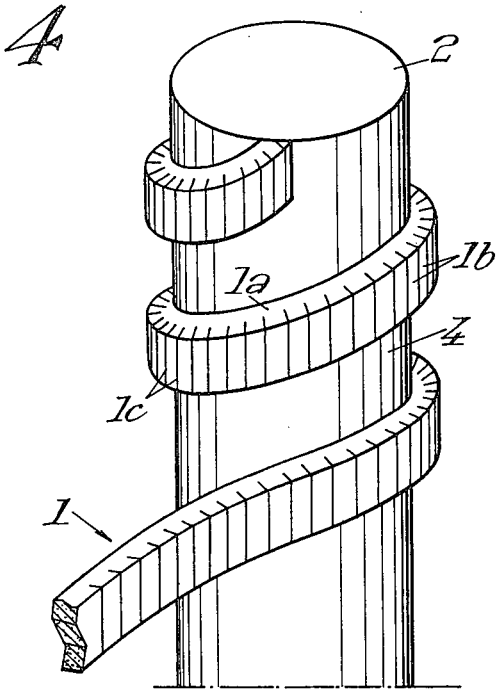

FIG. 4 shows a charge of an igniter (for a rocket-motor of the solid propergol) constituted by winding in non-contiguous turns and gluing the aforesaid strip 1 on a mandrel 2, the slits of the wound portion of the strip (open slits) being shown by a single line for simplicity in the drawing.

The separation between turns constitutes a helicoidal channel 4 facilitating the flow of the combustion products.

The operational characteristics of the igniter depend on the dimensional characteristics of the strip 1 (here comprising the slit 1c) and, especially, on the length of the aforesaid strip, as well as on the nature of the propergol.

As is self-evident and as emerges already from the preceding description, the invention is in now way limited to those of its methods of application, nor to those of its methods of production of its various parts, which have been more particularly indicated; it embraces, on the contrary, all variations, especially those relating to multiple charge igniters resulting from combinations of the previously described methods of fabrication.

We claim:

1. An igniter element for a generator of hot gas, said igniter element comprising a deformable plate constituted of solid hot gas generating material, one face of said plate having continuous parallel striae constituted by single slits with initially contiguous lips and extending from one end to the other of said plate, the other face of said plate being unstriated, a rigid central mandrel against which said unstriated face is wound and fixed so that the plate forms a single layer on the exterior of the mandrel without overlapping, said slits being oriented at least approximately parallel to the axis of said central mandrel and the lips of said slits being flared outwardly because of the wound configuration of said deformable plate around said mandrel, said striae thus forming continuous outwardly open flame conducting channels open at their ends and providing a considerable passage cross-section for the flow of the combustion products for a given diametric bulk, said mandrel being constituted of a material nonconsummable under the conditions of temperature and duration of operation of the igniter, said igniter element having been fabricated by forming said parallel striae in said plate in an unwound state, and thereafter winding the striated plate around said central mandrel to thus open said striae toward the exterior.

2. An igniter element according to claim 1, wherein the deformable plate wound around the central mandrel forms a cylindrical sleeve.

3. An igniter element according to claim 1, wherein the deformable plate is strip-shaped and forms a helix around the central mandrel.

* * * * *